US 8,472,358 B2

(12) United States Patent
Torsner et al.

(10) Patent No.: US 8,472,358 B2
(45) Date of Patent: *Jun. 25, 2013

(54) METHOD AND APPARATUS IN A TELECOMMUNICATION SYSTEM

(75) Inventors: Johan Torsner, Masaby (FI); David Astely, Bromma (SE); Stefan Parkvall, Stockholm (SE); Tobias Tynderfeldt, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 13/354,929

(22) Filed: Jan. 20, 2012

(65) Prior Publication Data

US 2012/0120855 A1    May 17, 2012

Related U.S. Application Data

(63) Continuation of application No. 12/594,976, filed as application No. PCT/SE2008/050386 on Apr. 3, 2008, now Pat. No. 8,134,940.

(30) Foreign Application Priority Data

Apr. 11, 2007   (SE) .................................... 0700902

(51) Int. Cl.
*H04J 3/00* (2006.01)

(52) U.S. Cl.
USPC ............ 370/280; 370/229; 370/276; 370/281

(58) Field of Classification Search
USPC ................. 370/203, 204, 205, 206, 230, 229, 370/231, 232, 235, 252, 253, 276, 277, 280, 370/281, 282, 294, 295, 310, 312, 329, 321, 370/328, 473, 474, 498, 441, 342; 455/436, 455/442, 450, 510, 561, 203, 204, 205, 206, 455/230, 229, 231, 232, 235, 252, 253, 276, 455/277, 280, 281, 282, 294, 295, 310, 312, 455/329, 321, 328, 473, 474, 498, 441, 342; 375/260; 714/749
See application file for complete search history.

(56) References Cited

U.S. PATENT DOCUMENTS 6,775,256 B1    8/2004   Hill et al.
7,139,251 B1   11/2006   Varma
(Continued)

FOREIGN PATENT DOCUMENTS

JP    H11-504177 A    4/1999
JP     11261518 A     9/1999
(Continued)

OTHER PUBLICATIONS

Decision on Grant issued in re Application No. RU 2009141607 filed Apr. 3, 2008.
(Continued)

*Primary Examiner* — Abdullah Riyami
(74) *Attorney, Agent, or Firm* — Coats & Bennett, P.L.L.C.

(57) ABSTRACT

Method and apparatus in a communication unit employing a wireless TDD or half duplex FDD transmission arrangement when communicating with a data sending party, for scheduling feedback reports for data blocks in received receive (RX) sub-frames, in transmit (TX) sub-frames available for transmission. An obtaining unit in the communication unit receives allocation parameters for the connection where the number of required feedback reports is greater than the number of allowed feedback reports. A scheduling unit in the communication unit then schedules feedback reports in available TX sub-frames according to a predetermined spreading rule also known by the data sending party, dictating that the feedback reports are spread out or distributed evenly over the available TX sub-frames. In this way, the number of feedback reports in a TX sub-frame can be reduced.

24 Claims, 3 Drawing Sheets

U.S. PATENT DOCUMENTS

| | | | |
|---|---|---|---|
| 7,817,613 B2 * | 10/2010 | Anderson | 370/342 |
| 8,031,583 B2 * | 10/2011 | Classon et al. | 370/208 |
| 2002/0141367 A1 * | 10/2002 | Hwang et al. | 370/335 |
| 2002/0172208 A1 | 11/2002 | Malkamaki | |
| 2004/0005887 A1 * | 1/2004 | Bahrenburg et al. | 455/422.1 |
| 2004/0224697 A1 * | 11/2004 | Hakkinen et al. | 455/450 |
| 2005/0201325 A1 * | 9/2005 | Kang et al. | 370/328 |
| 2006/0048034 A1 | 3/2006 | Cho | |
| 2006/0291410 A1 * | 12/2006 | Herrmann | 370/328 |
| 2007/0064669 A1 * | 3/2007 | Classon et al. | 370/347 |
| 2007/0150788 A1 * | 6/2007 | Zhuyan | 714/749 |
| 2007/0211620 A1 * | 9/2007 | McBeath et al. | 370/209 |
| 2007/0254662 A1 * | 11/2007 | Khan et al. | 455/436 |
| 2007/0258540 A1 * | 11/2007 | Ratasuk et al. | 375/267 |
| 2008/0031179 A1 * | 2/2008 | Gao et al. | 370/312 |
| 2008/0125155 A1 * | 5/2008 | Saito | 455/510 |
| 2009/0103498 A1 * | 4/2009 | Nilsson et al. | 370/336 |
| 2009/0137230 A1 * | 5/2009 | Miyoshi et al. | 455/414.1 |
| 2010/0027446 A1 * | 2/2010 | Choi et al. | 370/280 |
| 2010/0027495 A1 * | 2/2010 | Che et al. | 370/329 |
| 2010/0046460 A1 * | 2/2010 | Kwak et al. | 370/329 |

FOREIGN PATENT DOCUMENTS

| | | |
|---|---|---|
| RU | 2259636 C1 | 8/2005 |
| WO | 9634468 A1 | 10/1996 |
| WO | 9835514 A2 | 8/1998 |
| WO | 0139433 A2 | 5/2001 |
| WO | 03047189 A1 | 6/2003 |
| WO | 2005074184 A2 | 8/2005 |
| WO | 2007017731 A1 | 2/2007 |

OTHER PUBLICATIONS

Nokia; ACK/NACK Channel Structure in E-UTRA TDD Downlink; 3GPP TSG-RAN WG1#48; R1-071006; Feb. 12-16, 2007; St. Louis, USA.

Motorola, "TDD Numerology and Alignment with FDD", 3GPP RAN1#46-bis; R1-062662, Oct. 9-13, 2006; Seoul, South Korea.

* cited by examiner

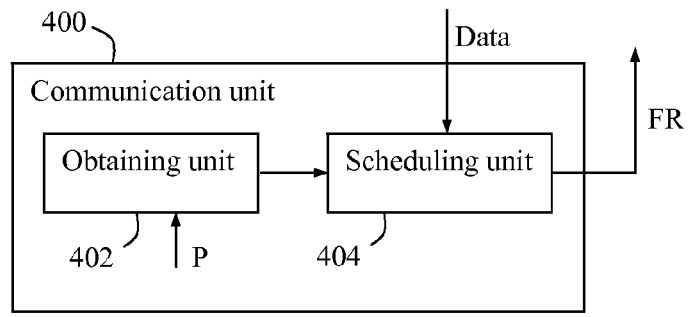
Fig. 4
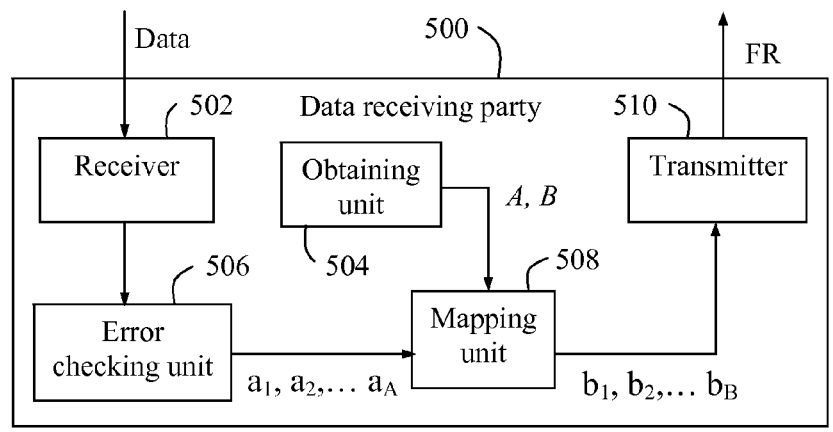
Fig. 5
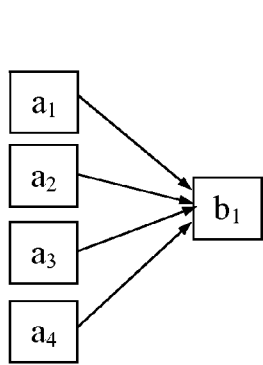
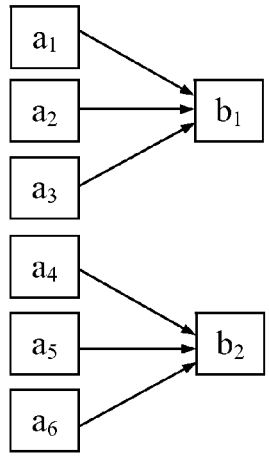
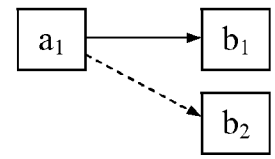
Fig. 5a　　　　　　Fig. 5b　　　　　　Fig. 5c

METHOD AND APPARATUS IN A TELECOMMUNICATION SYSTEM

This application is a continuation of prior U.S. application Ser. No. 12/594,976, filed 7 Oct. 2009, which is a U.S. National Stage of International Application No. PCT/SE2008/050386, filed 3 Apr. 2008, which claims benefit of Sweden Patent Application 0700902-0, filed 11 Apr. 2007, all of which are incorporated herein by reference.

TECHNICAL FIELD

The present invention relates generally to a method and apparatus for optimizing wireless transmissions in a telecommunication system using TDD (Time Division Duplex).

BACKGROUND

In 3GPP (3rd Generation Partnership Project), the cellular packet-switched communication systems HSPA (High Speed Packet Access) and LTE (Long Term Evolution) have been specified for radio transmission of data packets between user terminals and base stations in a cellular/mobile network. Transmissions from the base station to the user terminal is referred to as "downlink" DL and transmissions in the opposite direction is referred to as "uplink" UL. In the following description, "terminal" is used to generally represent any user equipment (commonly referred to as UE in the above systems) capable of wireless communication, e.g. with base stations in a cellular/mobile network.

There are two basic modes of operation available for wireless transmissions: FDD (Frequency Division Duplex) and TDD (Time Division Duplex). In FDD, downlink and uplink transmissions are made at separate frequency bands, such that data can be transmitted in the downlink and uplink at the same time without mutual interference. In TDD, on the other hand, downlink and uplink transmissions are made on the same frequency band and must therefore be separated in time to avoid interference.

The TDD operation mode is flexible in that the duration of downlink and uplink transmissions can be configured depending on the traffic intensity in the respective downlink and uplink directions, thus allowing for connections with asymmetric transmission schemes. In a cellular system with multiple cells, each cell being served by a base station, interference between uplink and downlink transmissions should be avoided. Therefore, the base stations are typically coordinated for synchronized operation where the uplink and downlink periods of the cells in the same area occur simultaneously. For asymmetric connections with downlink intensive traffic, the downlink time period may be configured greater than the uplink time period, and vice versa for connections with uplink intensive traffic.

For LTE, a new physical layer is currently being standardized in 3GPP that is based on OFDM (Orthogonal Frequency Division Multiplexing) in the downlink and SC-FDMA (Single Carrier Frequency Division Multiple Access) in the uplink. The new physical layer shall support both FDD and TDD operation, and there should be a high degree of commonality between these two modes of operation. The SC-FDMA properties in the uplink require that any data transmitted from each terminal basically maintains single carrier properties.

The transmissions in both FDD and TDD operation are generally scheduled in radio frames, and each radio frame is typically divided into multiple sub-frames. In the following description, the term "sub-frame" is used to generally represent a predefined transmission time interval (sometimes referred to as "TTI") or time slot, in which information can be transmitted in the form of "data blocks", although not limited to any particular standard or duration. Blocks of data can thus be transmitted in each sub-frame. For example, a base station may transmit data blocks to one or more terminals in each sub-frame, and a terminal can be assigned resources for a data block in each downlink sub-frame. Further, one or more terminals can transmit data blocks in assigned resources in uplink sub-frames to the base station.

In LTE, the predefined radio frame is 10 ms (milliseconds), which is divided into ten predefined sub-frames of 1 ms duration each. In the FDD mode, where data can be transmitted in the downlink and uplink simultaneously, there are 10 downlink sub-frames "DL" and 10 uplink sub-frames "UL" available during one radio frame on separate frequency bands $F_1$ and $F_2$, respectively, as illustrated schematically in FIG. 1a. In the TDD mode, there are in total ten downlink and uplink sub-frames available for data transmission during one radio frame, which can thus be transmitted only one at a time on a common frequency band F. In general, guard periods are needed to separate uplink sub-frames from downlink sub-frames, and one or two downlink sub-frames may therefore be somewhat shorter which could be considered as downlink parts of time slots or sub-frames, and there may also be certain uplink time slots not used for data, which is however not necessary to describe in more detail to understand the present invention.

As mentioned above, downlink and uplink transmissions can be configured in TDD on a cell basis depending on the traffic demands in either direction. For example, the downlink/uplink allocation can be configured to eight downlink sub-frames and two uplink sub-frames during one radio frame on the same frequency band F, as illustrated schematically in FIG. 1b. Another possible configuration could be 5 DL:5 UL sub-frames, and yet another configuration could be 7 DL:3 UL sub-frames. The alternation pattern of downlink/uplink sub-frames can also be configured optionally. For example, the downlink/uplink sub-frame pattern in FIG. 1b could be modified into eight successive downlink sub-frames followed by two uplink sub-frames.

A base station may transmit data blocks in downlink sub-frames to one or more terminals, and the terminals transmit data blocks in uplink sub-frames to the base station. More specifically, the base station may transmit commands in each downlink sub-frame to the terminals that data blocks are allocated for them in the current downlink sub-frame. The base station could also transmit a more persistent allocation with a pattern of downlink allocations to a terminal, so that it may, e.g., receive a data block every 20 ms.

The transmission in either direction is typically subjected to various disturbances, including propagation fading and interference from reflections and other transmissions, such that errors may have been introduced in the data blocks when received. Thus, the channel between a base station and a terminal is often referred to as a "lossy" channel. Errors may also arise due to a poor receiver and/or antenna.

When receiving a data block in a sub-frame, the receiver in the terminal (or in the base station) is configured to check as to whether any errors are present in the received data block. A common method of detecting errors involves calculation of a check-sum or the like, which is well-known in the art. To enable correction of such errors, the data sending party must retransmit any erroneously received data block, unless some error correction mechanism can be applied successfully at the data receiving party. Therefore, the data receiving party is typically obliged to send a feedback report to the data sending party for each received data block or sub-frame, indicating if the data block was basically received correctly (i.e. without errors) or not. In LTE, for example, when certain forms of multiple antenna transmission are used, a single terminal can also receive two data blocks in the same sub-frame, each data block requiring a feedback report. In that case, the terminal is thus obliged to transmit feedback reports for both data blocks.

If the data block was received correctly, the data receiving party sends an acknowledgement "ACK", and if the data block contained errors, it sends a negative acknowledgement "NACK". Although the terms ACK and NACK are frequently used in this description, any equivalent or similar messages may be used for feedback reports and the present invention is not limited in this respect. "Feedback report" is used in the following as a generic term for such ACK/NACK messages and their equivalents, and one feedback report is basically needed for each received data block.

Both HSPA and LTE employ a HARQ (Hybrid Automatic Repeat ReQuest) protocol in their respective MAC (Medium Access Control) layers. The basic functionality of the processes defined in the HARQ protocol is to correct any erroneously received data blocks by means of retransmission based on the above-described feedback reporting mechanism. In this context, a feedback report is sometimes called "HARQ status report".

For example, the data receiving party can simply discard an erroneously received packet. In more advanced solutions, the receiving party stores the signal representing the erroneously received packet in a buffer and combines this stored information with the retransmission. This is often referred to as "HARQ with soft combining" which can be used to increase the probability of correctly decoding the transmitted packet. In HARQ with soft combining, the pattern of coded bits in a particular packet may differ between transmission and retransmission, although they must obviously represent the same information.

The HARQ process is used to associate a potential retransmission to its original transmission in order to enable the soft combining at the data receiving party. When the receiving party has reported correct reception of data sent on a HARQ process, that process can be used to transmit new data. Consequently, before the reception of a HARQ status report from the receiving party, the data sending party does not know whether it should transmit new data or retransmit the "old data". In the meantime, the sending party therefore "stops and waits" until the result of the transmission is reported. In order to still be able to utilize the link during these waiting periods, multiple parallel HARQ processes can be applied which allows for continuous transmission.

For example, when a data block is transmitted on the downlink, the receiving terminal checks for errors in the data block and sends a feedback report to the base station. If the base station then detects a NACK, it can retransmit the information in the data block. This mechanism can also be used for data blocks sent on the uplink. In LTE, the feedback required for HARQ with soft combining is conveyed by a single bit indicating either ACK or NACK. The timing relation between the data block transmission from the sending party and the feedback report transmission from the receiving party is typically used to indicate which data block the feedback report relates to.

In FDD, the number of available sub-frames is equal in the downlink and the uplink, as shown in FIG. 1a. Consequently, it is possible to send a feedback report for one received downlink sub-frame in a given uplink sub-frame according to a "one-to-one relation", using a fixed time interval between reception and feedback. Thereby, the data sending party can derive which HARQ process a received feedback report refers to, based on which sub-frame the report was received in. Thus, for FDD, the feedback reports for data blocks received in a downlink sub-frame n are always transmitted in uplink sub-frame n+k, where k corresponds to the processing delay in the terminal which has been agreed as k=4 for LTE FDD. Further, if uplink resources have been allocated for a terminal in the corresponding uplink sub-frame, it may transmit the feedback report in a time-multiplexed fashion together with the transmitted data block. If the terminal has not been allocated any resources for data, it will use a certain control channel in that specific uplink sub-frame. Hence, the terminal is either explicitly or implicitly assigned a feedback resource in uplink sub-frame n+k.

In TDD, on the other hand, this fixed feedback scheme is not useful since when data is received in sub-frame n, sub-frame n+4 may not be an uplink sub-frame and hence no opportunity to send a feedback report. One example of this is when there are more than four consecutive DL sub-frames in the downlink/uplink sub-frame pattern. Another example is when the sub-frame pattern dictates that the next three sub-frames are uplink sub-frames but the fourth is a downlink sub-frame. A further example is when the next sub-frame is downlink, the following two ones are uplink and the fourth one is again a downlink sub-frame. Furthermore, the allocation of uplink and downlink sub-frames may be such that the number of downlink sub-frames is greater than the number of uplink sub-frames.

In the allocation example shown in FIG. 2, there are eight downlink sub-frames but only two uplink sub-frames available. Hence, feedback reports for the eight downlink sub-frames must be transmitted in the two uplink sub-frames. Depending on how many users that have been scheduled in the downlink sub-frames, the number of feedback reports that need to be transmitted may increase by a factor 4. Furthermore, if a single terminal has been scheduled to receive data in all available downlink sub-frames, that terminal will need to transmit feedback reports for a plurality of downlink sub-frames during a single uplink sub-frame.

In TDD, the above-described report mechanism with a fixed time interval cannot generally be used, since the feedback report for a received sub-frame cannot be transmitted a fixed time interval after receiving the sub-frame if the corresponding sub-frame is not available for transmission from the data receiving party. Consequently, the feedback report for that received sub-frame must be delayed at least to the first sub-frame available for transmission. Moreover, the data receiving party typically requires a certain delay after receiving a sub-frame, for processing the data therein and to determine if it was received correctly or not, before a feedback report can be sent for that sub-frame. For example, if the receiver of data needs a delay of at least one sub-frame for processing, a received sub-frame k cannot be reported until sub-frame k+2 or later. If the receiver needs three sub-frames for processing, as in LTE, then the feedback cannot be reported until sub-frame k+4, and so forth.

A straightforward and obvious solution for the timing or scheduling of feedback reports in TDD, is to specify a minimum delay period needed for processing, from the point data is received in a sub-frame until a feedback report shall be transmitted for the received data. The feedback report is then sent in the first available sub-frame for transmission in the reverse direction after the minimum delay period. Hence, if one or more sub-frames after the delay period are allocated for reception, the feedback report must be further delayed until the first sub-frame allowing transmission occurs.

However, as a result of scheduling feedback reports according to the timing solution above, a great number of feedback reports will typically be transmitted in the same sub-frame. This could also be the case even when the number of uplink and downlink sub-frames is the same with a certain periodicity. This is particularly a problem when it is desirable to reduce the number of such reports in a single sub-frame, and particularly the maximum number of feedback reports that a single terminal may need to send as a consequence of the downlink scheduling assignments.

In FIG. 2, this is illustrated by means of an example where an asymmetric connection is configured with eight successive downlink sub-frames (sub-frame 0-7) followed by two uplink sub-frames (sub-frame 8-9). In this example, the minimum delay period needed for processing is specified as one sub-frame. Following the obvious timing solution above, feedback reports for data received in sub-frames 0-6 will all be transmitted in sub-frame 8 and the feedback report for sub-frame 7 will be transmitted in sub-frame 9 after the necessary one sub-frame minimum delay, as illustrated by dashed arrows.

If the physical channel structure must be configured to handle a great number of feedback reports in a single sub-frame, and also if a single terminal needs to transmit feedback reports for multiple DL sub-frames, as in sub-frame 8 above, the channel structure will become more complex. Also, the more feedback reports to transmit from a terminal, the more feedback resources are needed, e.g., in terms of number of codes. Hence, more bits to send from a single terminal basically require more feedback resources. Furthermore, a relatively great transmission power would then also be required to obtain sufficiently low error probability when several feedback reports are transmitted simultaneously, which is a problem as the transmission power should generally be kept low considering power consumption and network interference problems.

SUMMARY

It is an object of the present invention to address the problems outlined above. Further, it is an object to provide a solution that can be used to reduce the number of feedback reports in sub-frames, and also to generally reduce channel complexity as well as power consumption and network interference. These objects and others may be obtained by a method and apparatus according to the independent claims attached below.

According to one aspect, a method is provided in a communication unit acting as a data receiving party and employing a TDD or half duplex FDD arrangement when communicating with a data sending party, of transmitting feedback reports for data blocks received in RX sub-frames to indicate whether errors have occurred in the received data blocks. According to another aspect, an apparatus is also provided in the communication unit above.

In the method and apparatus, an obtaining unit obtains allocation parameters for the connection indicating that the number of required feedback reports is greater than the number of allowed feedback reports during a given sub-frame sequence. Further, a scheduling unit schedules feedback reports in available TX sub-frames according to a predetermined spreading rule also known by the data sending party, dictating that the feedback reports are spread out or distributed evenly over the available TX sub-frames. Thereby, the number of feedback reports in a TX sub-frame can be reduced.

For example, the number of allocated RX sub-frames may exceed the number of allocated TX sub-frames, according to the obtained allocation parameters. Furthermore, the allocated RX sub-frames and TX sub-frames in the TDD or half duplex FDD arrangement may be arranged in a given repeated sequence of sub-frames in a radio frame.

Different embodiments are possible in the method and apparatus above. In one embodiment, the predetermined spreading rule further dictates that the number of RX sub-frames reported in any TX sub-frame is minimized, and that the maximum delay between any RX sub-frame and its associated TX sub-frame is minimized. The spreading rule may also dictate that a feedback report is transmitted as soon as possible under the restriction that feedback reports for no more than X RX sub-frames are sent per TX sub-frame in transmit direction, where X=CEILING $(k_{RX}/k_{TX})$, $k_{RX}$=the number of allocated RX sub-frames, and $k_{TX}$=the number of allocated TX sub-frames. CEILING is a mathematical operation that rounds up to the next integer.

The solution above can be implemented such that the communication unit acting as the data receiving party is a terminal. In that case, the RX sub-frames are downlink sub-frames and the TX sub-frames are uplink sub-frames. On the other hand, the communication unit above may be a base station and the RX sub-frames are then uplink sub-frames and the TX sub-frames are downlink sub-frames.

In further embodiments, a compressed feedback report is scheduled that refers to a set of data blocks in plural received RX sub-frames, if the number of feedback reports scheduled according to the predetermined spreading rule is greater than the number of bits or messages available for reporting. The compressed feedback report may indicate correct reception (ACK) if all the data blocks in the set have been received correctly, and incorrect reception (NACK) if at least one data block in the set has been received with errors. The data sending party is then able to retransmit the data blocks in the set if the compressed feedback report indicates incorrect reception. The compressed feedback report may further contain a plurality of bits or messages each referring to a specific set of received data blocks.

In further embodiments, A mapping operation is performed to associate each received data block or RX sub-frame with the feedback report(s). A plurality of bits or messages in a feedback report may then refer to a single received data block, if the number of bits or messages available for reporting is greater than the number of received data blocks to report.

In yet another embodiment, the RX sub-frames are divided into groups or sets, so that each TX sub-frame corresponds to a specific group or set of RX sub-frames.

The solution above can be applied when using a Hybrid ARQ (HARQ) protocol whereby each feedback report includes an ACK message or a NACK message.

Further possible features and benefits of the present invention will be explained in the detailed description below. Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

The invention will now be explained in more detail by means of exemplary embodiments and with reference to the accompanying drawings, in which:

FIG. 4 is a block diagram schematically illustrating a communication unit acting as a data receiving party adapted to schedule feedback reports in available sub-frames, in accordance with another embodiment.

FIG. 5 is a block diagram schematically illustrating a communication unit acting as a data receiving party adapted to schedule compressed feedback reports in available sub-frames, in accordance with another embodiment.

FIG. 5a-c are logic diagrams illustrating some possible mapping operations in the data receiving party, in accordance with further embodiments.

DETAILED DESCRIPTION

Figure 1A:
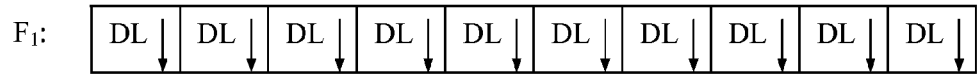
FIG. 1a is a diagram illustrating a wireless FDD transmission scheme, according to the prior art.
Figure 1A:
Figure 1B:
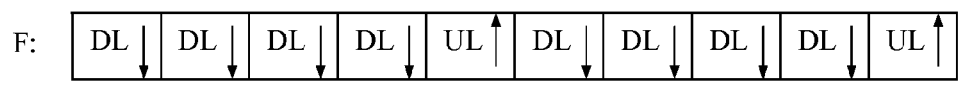
FIG. 1b is a diagram illustrating a wireless TDD transmission scheme, according to the prior art.

The present invention can be used for reducing the maximum number of feedback reports to send in a single sub-frame from a communication unit or network node having received data in multiple sub-frames from a data sending party, in a wireless connection using an asymmetric TDD transmission scheme. In some embodiments, the size of a feedback report can be reduced or compressed to a single bit representing a joint feedback report for plural received sub-frames and data blocks, which in turn may reduce the required amount of feedback information and more importantly improve the uplink performance in terms of coverage and capacity.

The skilled person will understand that the following embodiments can also be applied in a half duplex FDD transmission scheme where the number of allocated sub-frames may likewise differ in the downlink and uplink directions. The communication unit or network node will also be referred to as the data receiving party in the following description. The data sending party may be a base station and the data receiving party may be a terminal, or vice versa. Further, sub-frames allocated for reception and transmission by the data receiving party will be referred to as "RX sub-frames" and "TX sub-frames", respectively. If the data receiving party is a terminal, the RX and TX sub-frames are DL and UL sub-frames, respectively.

It is generally assumed that for TDD operation, each sub-frame in a radio frame is at least allocated to either uplink or downlink. Typically, a scheduler in the base station assigns resources for data transmission in downlink sub-frames and uplink sub-frames for a connection of a certain terminal. For the packet-oriented LTE system, the assignment of resources may be done either in a very dynamic way so that the assignments varies from sub-frame to sub-frame, or in a more persistent way so that resources are allocated with a certain periodicity for the connection.

Further, in LTE, the allocation of sub-frames to uplink and downlink is done per cell which can be broadcasted to all terminals in the cell, or communicated to a terminal at handover to the cell. In the general case, the allocation could be done per connection or terminal. For example, the number of sub-frames allocated to downlink may be greater than the number of sub-frames allocated to uplink, or the first sub-frame after a predefined delay for processing a received data block is not an uplink sub-frame.

When applying the embodiments described below in specific communication connections or sessions, certain parameters and transmission restrictions relating to the allocation scheme used for the current connection will be considered, in the following generally referred to as "allocation parameters". The allocation parameters thus generally dictate which sub-frames are allocated for data reception and which sub-frames are available for feedback reporting, respectively.

The allocation parameters to consider comprise how the sub-frames are allocated for reception and transmission, such as UL/DL allocation on a cell level. The allocation parameters may further comprise the number of data blocks that the data receiving party can receive in a single RX sub-frame as well as the number of feedback reports allowed to be sent in one TX sub-frame in response to the reception of the data blocks.

The number of allowed feedback reports in a sub-frame may be configurable or may have been preconfigured in the data receiving party equipment according to a prevailing communication standard. For example, the standard may stipulate that only one bit (0 or 1 in a binary system) is allocated for feedback reports in each transmission sub-frame in the reverse link, such that only one report (ACK or NACK) can be sent in each sub-frame. In another alternative, the feedback resources to be used for the feedback reports as well as the size of possible feedback reports may be communicated together with the data, depending on how many and in which sub-frames the data receiving party receives data blocks.

Briefly described, when scheduling individual feedback reports for plural received data blocks, a feedback schedule which is shared by both the data transmitting party and the data receiving party must be used. According to this feedback schedule, the communication unit (i.e. the data receiving party) spreads or distributes the individual feedback reports evenly over the available sub-frames allocated for the reverse link. The feedback reports are then spread or distributed according to a predetermined spreading rule, which is determined by the allocation of sub-frames to TX and RX as well as other allocation parameters stipulated for the current connection.

The number of feedback reports in a sub-frame can also be reduced by sending a "compressed" or "concatenated" feedback report to the data sending party that refers to a set of plural received data blocks collectively. In that case, a mapping operation is performed to associate the feedback report with the received sub-frames in the set and to generate the feedback report from decoding results of the respective received sub-frames, depending on the prevailing allocation parameters including which sub-frames that were received. A compressed feedback report can be used in combination with the above-described spreading of individual feedback reports, or separately. Various exemplary embodiments for realizing the present solution will be described in more detail below.

Figure 2:
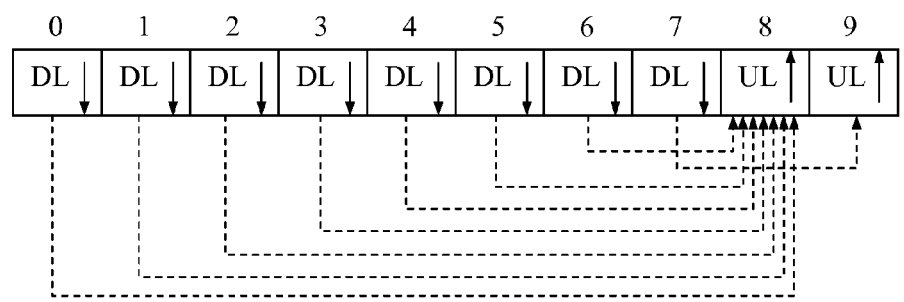
FIG. 2 is a diagram illustrating an obvious feedback reporting scheme for TDD, according to the prior art.
Figure 3:
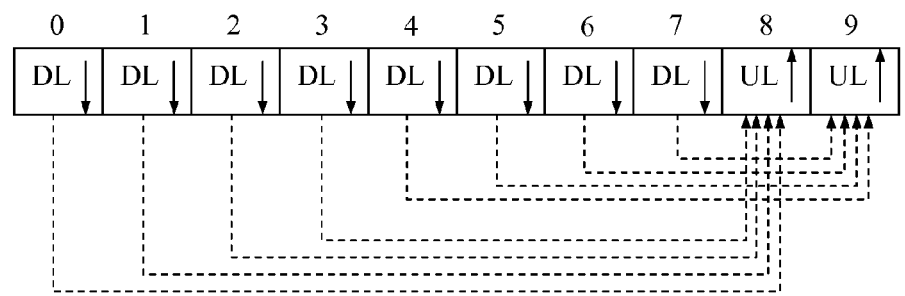
FIG. 3 is a diagram illustrating a novel feedback reporting scheme for TDD, in accordance with one embodiment.

FIG. 3 illustrates schematically an example of how the number of feedback reports to be sent in a sub-frame can be minimized by spreading, when using the same allocation scheme as of FIG. 2. In this example, the data sending party is a base station and the data receiving party is a terminal. Thus, sub-frames 0-7 are allocated to DL and the data sending party is able to transmit data blocks in any number of these sub-frames 0-7. Furthermore sub-frames 8 and 9 are allocated to UL, and can hence be used for feedback transmission from the terminal. Transmitting the feedback reports as soon as possible in the first available UL sub-frame according to the obvious solution described in the background, which would satisfy an assumed processing delay of one sub-frame, results in seven feedback reports sent in sub-frame 8 and one feedback report sent in sub-frame 9, as shown in FIG. 2.

In the solution of FIG. 3, however, the feedback reports are spread out or distributed evenly over the available sub-frames according to a predetermined spreading rule which is known by both data sending and receiving parties. In this case, the spreading rule dictates that feedback reports referring to the four sub-frames 0-3 are transmitted in sub-frame 8, and feedback reports referring to the four sub-frames 4-7 are transmitted in sub-frame 9. Hence, feedback reports for no more than four sub-frames are sent in a single sub-frame.

In more general terms, feedback reports for data received in a sub-frame n should be transmitted in a sub-frame n+k, where k is a delay given by the predetermined spreading rule. Using the exemplary feedback scheme shown in FIG. 3, k depends on the sub-frame number n as shown in table 1 below. Hence, n+k=8 for data received in sub-frames 0-3, and n+k=9 for data received in sub-frames 4-7.

TABLE 1

| Sub-frame n: | 0 | 1 | 2 | 3 | 4 | 5 | 6 | 7 |
|---|---|---|---|---|---|---|---|---|
| Delay k: | 8 | 7 | 6 | 5 | 5 | 4 | 3 | 2 |

The predetermined spreading rule can be defined in different ways, and the present invention is not limited to any specific spreading rule. An exemplary spreading rule, dictating how to spread out or distribute the feedback reports over plural reverse link sub-frames, could be as follows:

It is assumed that a TDD configuration (i.e. transmission scheme) is used with $k_{RX}$ sub-frames allocated in the data receiving direction and $k_{TX}$ sub-frames allocated in the data transmitting direction, as seen from the terminal (data receiving party). Further, no more than $k_{FR}$ data blocks requiring feedback reports can be conveyed per sub-frame. $k_{RX}$, $k_{TX}$ and $k_{FR}$ thus constitute allocation parameters in this case. The spreading rule then dictates that:

"A feedback report is transmitted as soon as possible under the restriction that feedback reports for no more than X data blocks or RX sub-frames are sent per sub-frame in transmit direction, where X=CEILING ($k_{FR}*k_{RX}/k_{TX}$)".

CEILING is a mathematical operation that when applied to a value, rounds up the value to the next integer. For example, CEILING(2.1)=3 and CEILING(2.0)=2. If only one data block can be received per sub-frame, $k_{FR}=1$ and X=CEILING ($k_{RX}/k_{TX}$). Applying the spreading rule above for the situation shown in FIG. 3, where $k_{RX}=8$ and $k_{TX}=2$, will result in four feedback reports in both sub-frames 8 and 9 if one data block can be received per sub-frame, i.e. $k_{FR}=1$.

It should be noted that the applied spreading rule is also known by the data sending party which therefore can derive which transmitted sub-frame each feedback report refers to. The skilled person will readily understand that the predetermined spreading rule can be defined in various different ways to serve the general purpose of reducing the maximum number of feedback reports to be sent in a sub-frame. For example, when the data receiving party is a terminal, the spreading rule could be refined so that each DL sub-frame becomes associated with an UL sub-frame, where the maximum number of associated DL sub-frames does not exceed X above. Thereby, the number of feedback reports becomes as similar as possible in the available UL sub-frames and the maximum delay for any DL sub-frame becomes as short as possible. Hence, according to the spreading rule, the data receiving party will know in which sub-frame(s) the feedback report for each received sub-frame should be transmitted.

FIG. 4 is a block diagram schematically illustrating an apparatus in a communication unit 400 employing a wireless TDD or half duplex FDD transmission scheme during a connection with a data sending party, not shown, for scheduling feedback reports for data received in assigned RX sub-frames, to assigned TX sub-frames available for transmission. Communication unit 400 may be a terminal (RX=DL, TX=UL) or a base station (RX=UL, TX=DL).

Communication unit 400 comprises an obtaining unit 402 adapted to generally obtain allocation parameters P for the connection, which can be either acquired, determined or detected during the connection or obtained as preconfigured according to standard. The allocation parameters P generally indicates that the number of required feedback reports that would be sent in a first available TX sub-frame after the minimum delay period, i.e. according to the obvious feedback scheduling method described in the background, is greater than the number of feedback reports that can be sent in a single TX sub-frame. For example, P may indicate that the number of allocated RX sub-frames is greater than the number of allocated TX sub-frames, or that the first sub-frame after an RX sub-frame and a processing delay is an RX sub-frame not allowing a feedback report, which would result in too many RX sub-frames to report in a TX sub-frame.

Communication unit 400 further comprises a scheduling unit 404 adapted to schedule one or more feedback reports for data blocks in the received RX sub-frames in available TX sub-frames according to a predetermined spreading rule known by both data sending and receiving parties, such that the feedback reports FR are spread out or distributed evenly over the TX sub-frames. Other functional units in communication unit 400 generally needed for reception, processing and transmission of data blocks have been omitted in FIG. 4 for simplicity.

When sending a compressed feedback report that refers to a set of plural received sub-frames, data blocks in the received sub-frames in the set are checked for errors. In the case when only one feedback bit indicating ACK or NACK can be sent, the compressed feedback report indicates correct reception (ACK) if all the data blocks in the set have been received correctly. On the other hand, the feedback report will indicate incorrect reception (NACK) if at least one data block in the set has been received with errors. In the latter case, the data sending party could for example retransmit all data blocks in the set, not knowing which was/were incorrectly received. Moreover, the feedback information could also be coded in the number of bits available for feedback reporting in the sub-frame(s) allocated for transmission from the data receiving party in order to improve the performance.

In order to send one compressed feedback report for data blocks in plural received sub-frames, the data receiving party will perform a mapping operation to determine the feedback report from the corresponding received sub-frames, depending on allocation parameters stipulated for the current connection. This mapping operation could be used also for cases when compression is not needed, e.g. see FIG. 5c below. The data receiving party will then perform the same mapping operation to identify which data block(s) or sub-frame(s) the feedback report refers to.

As in the previous example, the allocation parameters include at least the allocation of sub-frames to reception and transmission, as seen from the data receiving party. The allocation parameters further include the number of data blocks that can be received in a single sub-frame and the number of feedback reports that can be transmitted in a sub-frame. As in the above example, the prevailing communication standard may stipulate that only one bit (0 or 1 in a binary system) of each sub-frame is allocated for feedback reports. It may also stipulate that the number of bits in the feedback report depends on the maximum number of data blocks that can be received within an RX sub-frame. When certain forms of multiple antenna transmission techniques are used, two independently coded data blocks could be transmitted in each sub-frame, and the feedback report in this case can carry two bits in the sense that ACK/NACK can be reported individually for both data blocks of the same sub-frame.

An exemplary embodiment for performing a mapping operation to determine one or more feedback reports from multiple received sub-frames, will now be described with reference to FIG. 5 which illustrates some functional units or blocks in a data receiving party 500. It should be noted that FIG. 5 merely illustrates the various functional units in a logical sense, while the skilled person is free to implement these functions in practice using any suitable software and hardware means.

Each sub-frame received from a data sending party (not shown) may contain one or more data blocks directed to the data receiving party 500, which are checked for errors. It is assumed that there are in total B bits available for feedback reports in a given sub-frame sequence, e.g. a radio frame. In the general case, B represents the number of feedback messages that can be sent in the sequence. Even more generally, if each feedback message contains one bit, then in total $2^B$ different concatenated feedback messages can be sent.

Further, it is assumed that the data receiving party has been assigned A sub-frames for data reception within a given sub-frame sequence, whereby A error checking results, i.e. ACK/NACKs, are generated for the A RX sub-frames. For the case that the multiple data blocks can be conveyed in an RX sub-frame, the error checking results may stem from less than A sub-frames. For example, if there are two data blocks in each sub-frame, then the error checking results may stem from A/2 RX sub-frames. It is then proposed that a mapping that may depend on A and B is used to generate B feedback reports for the A RX sub-frames. In one embodiment, B can be a function of A. In another embodiment, the RX sub-frames could also be divided into groups or sets, so that each TX sub-frame corresponds to a group or set of RX sub-frames, and A refers to the number of assigned RX sub-frames within this group, whereas B is the number of bits available in that single TX sub-frame. It may also be useful to indicate in the mapping which RX and TX sub-frames in the sequence have been assigned for the data receiving party 500, i.e. the sub-frame pattern.

For example, B=2 if two TX sub-frames are allocated for transmission and one bit is available for feedback reports in each TX sub-frame, and B=4 if two TX sub-frames are allocated for transmission and two bits are available for feedback reports in each TX sub-frame, and so forth. Generally, if A is less than B the above encoding mechanism will introduce redundancy, whereas if A is greater than B a "lossy" encoding will be used as one feedback report must represent plural RX sub-frames.

Furthermore, in one embodiment, a single TX sub-frame with one feedback report bit, i.e. B=1, is used to convey a compressed feedback report for A assigned RX sub-frames, each containing a single data block within the set of RX sub-frames associated with that TX sub-frame. In another embodiment, there are two bits available for feedback reports in the TX sub-frame, i.e. B=2, and these feedback reports are determined from received data blocks in A RX sub-frames within the set of RX sub-frames associated with that TX sub-frame.

A communication unit acting as the data receiving party 500 comprises a receiver 502 adapted to receive data in RX sub-frames from the data sending party. An obtaining unit 504 is adapted to obtain allocation parameters including A and B, as similar to unit 402 in FIG. 4. An error checking unit 506 checks for errors in the received RX sub-frames and generates A error checking results (or ACK/NACKs) "a" for the RX sub-frames, in the figure indicated as $a_1, a_2, \ldots a_A$.

In this example, a mapping unit 508 is adapted to receive the parameters A and B from the obtaining unit 504. In practice, the obtaining unit 504 could be integrated as a function in the mapping unit 508 for obtaining or detecting prevailing allocation parameters. The mapping unit 508 is also adapted to receive from error checking unit 506 the A error checking results (or ACK/NACKs) $a_1, a_2, \ldots a_A$ and possibly also information on which RX sub-frame that were received. Mapping unit 508 is also adapted to perform a mapping operation to associate each RX sub-frame and corresponding error checking result with a feedback report "b".

Mapping unit 508 then generates B feedback reports, in the figure indicated as $b_1, b_2, \ldots b_B$, for the associated RX sub-frames. In the general case, each feedback report $b_1, b_2, \ldots b_B$ can be a function of all the A error checking results (or ACK/NACKs) $a_1, a_2, \ldots a_A$. The B feedback reports are then conveyed to a transmitter 510 which is adapted to finally send the feedback reports FR in TX sub-frames to the data sending party. The data receiving party will then perform the same mapping operation to identify which sub-frames the feedback reports B refer to.

A basic example is when B=1 and A>1 resulting in a compressed feedback report for A RX sub-frames. Then, a single NACK will be transmitted if data in one or more of the received RX sub-frames is erroneous, whereas a single ACK will be transmitted for the case that all data in the RX sub-frames has been received correctly.

Another example is when there are two bits available for reporting and four RX sub-frames need to be reported, i.e. B=2 and A=4, resulting in a compressed feedback report with two bits for four RX sub-frames, Then, two of the RX sub-frames could be mapped to the first feedback bit and the other two RX sub-frames may be mapped to the second feedback bit such that each bit in the feedback report carries data, i.e. error checking results, for two RX sub-frames. Here, the B=2 bits may be transmitted either in a single UL sub-frame or in two different sub-frames.

A third example is when there are two bits available for reporting, but only one RX sub-frame needs to be reported, i.e. B=2 and A=1. Then, the same feedback report or ACK/NACK may be transmitted in both available feedback bits, resulting in redundancy.

The feedback compression mechanism described above may be applied separately for each sub-frame in transmit direction, such that the feedback for a set of received RX sub-frames is associated with and encoded in the available number of bits for feedback information in a given TX sub-frame. Alternatively, the feedback information can be encoded jointly over all available bits for feedback information spanning several TX sub-frames in a given sub-frame sequence such as a radio frame.

FIGS. 5a-c illustrate schematically some examples of mapping operations that can be performed by the mapping unit 508. In FIG. 5a, four RX sub-frames $a_1, a_2, a_3$ and $a_4$ are mapped to one bit in a compressed feedback report $b_1$, i.e. B=1 and A=4. In FIG. 5b, the compressed feedback report contains two bits $b_1$ and $b_2$ where three RX sub-frames $a_1$, $a_2$, and $a_3$ are mapped to a first bit $b_1$, and another three RX sub-frames $a_4$, $a_5$, and $a_6$ are mapped to a second bit $b_2$, i.e. B=2 and A=6. In FIG. 5c finally, one RX sub-frame a1 is mapped to two bits $b_1$ and $b_2$ of a feedback report, i.e. B=2 and A=1, resulting in redundancy as the same RX sub-frame is reported twice. More generally, each of the feedback bits can be a function of the error checking results, as mentioned above.

Figure 6:
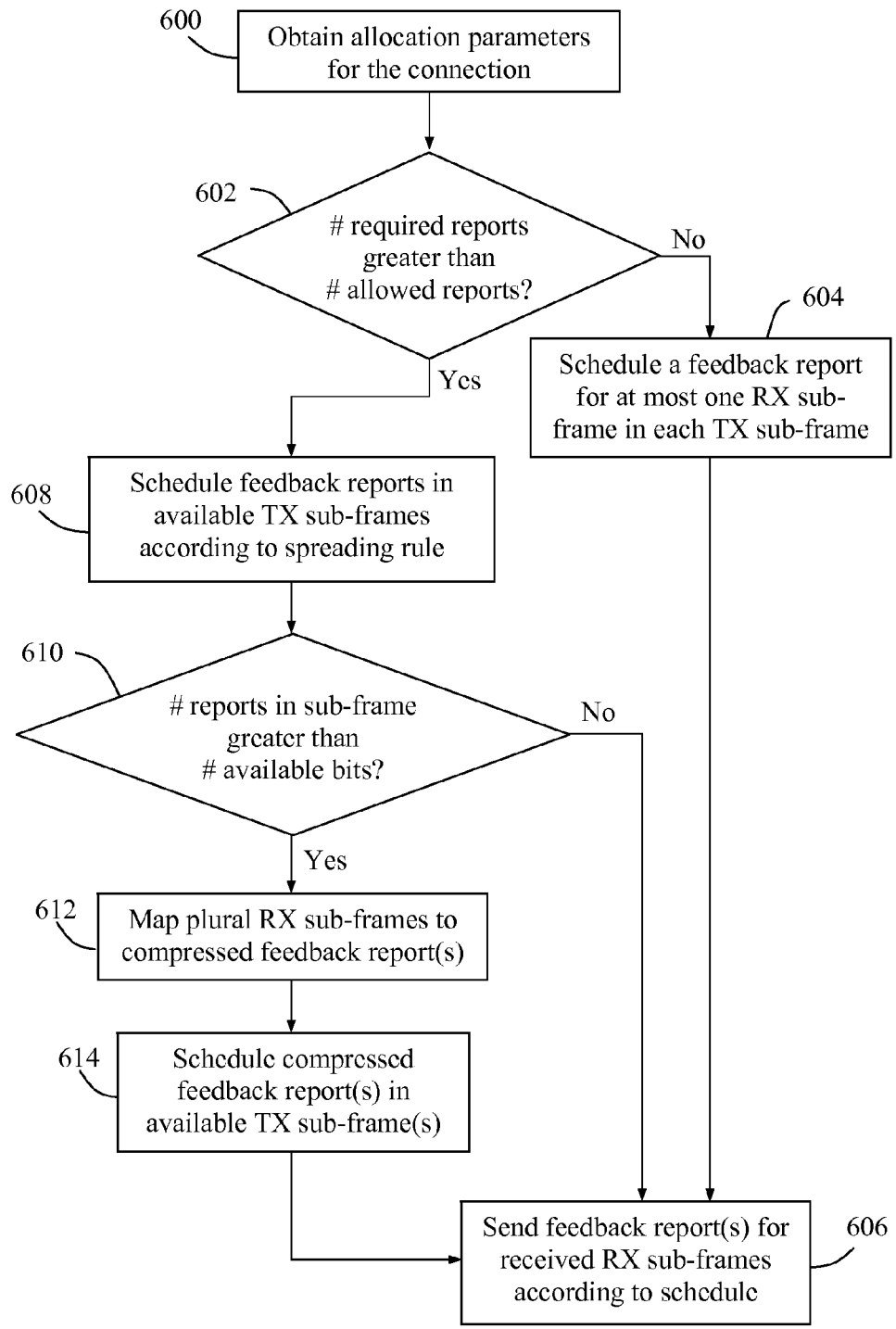
FIG. 6 is a flow chart illustrating a procedure for scheduling feedback reports in available sub-frames, in accordance with yet another embodiment.

FIG. 6 is a flow chart with steps that can be executed by a data receiving party when implementing at least the spreading mechanism above, for sending feedback reports for received data blocks to a data sending party during a wireless TDD communication connection. If there are more data blocks to report than bits or messages available for reporting, compressed feedback reports according to the mapping operation above can also be used to further reduce the number of feedback reports to be sent in a TX sub-frame. As in the previous examples, the data receiving party may be a terminal and the data sending party may be a base station, or vice versa.

In a first step 600, allocation parameters are obtained for the connection, including the TDD DL/UL allocation arrangement with RX and TX sub-frames and available feedback resources, i.e. the number of bits or messages for feedback reporting. If the data receiving party is a terminal, at least some of the allocation parameters can be received from a base station (i.e. the data sending party), for example during initial synchronization or at hand-over from another base station. The actually used sub-frames are typically determined dynamically by the base station.

In a next step 602, it is checked whether the number of allocated RX sub-frames exceeds the number of allocated TX sub-frames, within a given sub-frame sequence typically a radio frame, or if the number of required feedback reports for the RX sub-frames exceeds the number of allowed or possible feedback reports in the TX sub-frames. If the number of required feedback reports is generally not greater than the number of allowed feedback reports in step 602, the feedback report(s) for each RX sub-frame can be scheduled in one of the TX sub-frames such that a feedback report for at most one RX sub-frame is scheduled in each TX sub-frame, in a following step 604. Data blocks received in RX sub-frames from the data sending party are then checked for errors and feedback reports are sent for the received sub-frames in a step 606, according to the feedback report schedule established in step 604.

On the other hand, if the number of RX sub-frames is greater than the number of TX sub-frames, or more generally, if the number of required feedback reports is greater than the number of allowed feedback reports in step 602, feedback reports are scheduled in the available TX sub-frames according to a predetermined spreading rule in the manner described above for FIG. 3, in a step 608. As a result, a feedback report for each RX sub-frame is scheduled in an available TX sub-frame such that at least one TX sub-frame will carry feedback reports for more than one RX sub-frame.

It may then be further checked in a step 610 whether the number of feedback reports scheduled in step 608 is greater than the number of bits or messages available for reporting, i.e. the number of feedback reports allowed by the assigned feedback resources, according to the obtained allocation parameters. If not, it is possible to proceed to step 606 for sending feedback reports for received data blocks in RX sub-frames according to the feedback report schedule established in step 608 by using the spreading rule.

On the other hand, if the number of scheduled feedback reports is greater than the number of available bits or messages in step 610, a plurality of data blocks in RX sub-frames are mapped to one or more compressed feedback reports to associate the feedback report(s) with the corresponding received data blocks, in a further step 612. This mapping operation could be performed according to the description of FIG. 5 above. The compressed feedback report(s) is(are) then scheduled in available TX sub-frame(s), in a step 614, in order to proceed finally to step 606 of sending the compressed feedback report(s) for received data blocks in RX sub-frames according to the report schedule established in step 612 using the mapping operation.

An advantage of the present invention is that the number of transmitted feedback reports in a TX sub-frame in a given sub-frame sequence can be significantly reduced or at least minimized. This allows for simpler design of the physical channel carrying feedback reports and reduced transmitter power to achieve a given feedback report error probability. As a result, the power consumption and network interference problems will also be reduced. Hence, coverage and capacity for the control signaling can be improved since a terminal is able to transmit a smaller number of bits. Further, the amount of feedback resources reserved for feedback reports can also be reduced.

The present solution could also be defined as a method in a network node operating in a communication system with a TDD duplex arrangement employing a protocol for correcting block errors that occurs over the air interface, said protocol involves transmission of feedback reports from the receiver of data to the transmitter of said data, comprising the step of encoding the feedback reports to fit into the number of bits that are available for feedback information in one or more sub-frames, such that if the number of feedback reports to be transmitted is greater than the number of bits available for feedback information, the feedback reports are concatenated into the number of bits available. A predefined rule further defines a restriction for a maximum number of allowed feedback reports in one sub-frame in the transmit direction.

The present solution could also be defined as a method in a network node operating in a communication system with a TDD duplex arrangement employing a protocol for correcting block errors that occurs over the air interface, said protocol involves transmission of feedback reports from the receiver of data to the transmitter of said data, comprising the step of reducing the number of feedback signals to be transmitted in a sub-frame by spreading the feedback reports over available sub-frames according to a predefined rule known to the receiver and the transmitter. The predefined rule defines a restriction for a maximum number of allowed feedback reports in one sub-frame in the transmit direction.

The present solution could also be defined as a network node capable of operating in a communication system with a TDD duplex arrangement employing a protocol for correcting block errors that occurs over the air interface, said protocol involves transmission of uplink feedback reports, comprising means for performing any of the above-defined methods.

While the invention has been described with reference to specific exemplary embodiments, the description is in general only intended to illustrate the inventive concept and should not be taken as limiting the scope of the invention. Although the concepts of 3GPP, LTE, HSPA, MAC, radio frames, sub-frames, HARQ soft combining and ACK/NACK messages have been used when describing the above embodiments, any other similar suitable standards, protocols and mechanisms may basically be used to accomplish the functions described herein. In particular, the above-described embodiments could be applied in TDD as well as half duplex FDD transmission schemes. The present invention is generally defined by the following independent claims.

What is claimed is:

1. A method, in a communication unit acting as a data receiving party and employing a TDD or half duplex FDD arrangement when communicating with a data sending party, of transmitting feedback reports for data blocks received in receive (RX) sub-frames to indicate whether errors have occurred in the data blocks, the method comprising:
   obtaining allocation parameters for a connection indicating that a number of required feedback reports is greater than a number of allowed feedback reports during a given sub-frame sequence; and
   scheduling a compressed feedback report for transmission in a transmit (TX) sub-frame, the compressed feedback report providing feedback information for a set of a plurality of data blocks in plural RX sub-frames in the sub-frame sequence.

2. The method of claim 1 wherein the obtained allocation parameters indicate that a number of allocated RX sub-frames exceeds a number of allocated TX sub-frames.

3. The method of claim 1 wherein a predetermined spreading rule dictates that a number of RX sub-frames reported in any TX sub-frame is minimized and that a maximum delay between any RX sub-frame and its associated TX sub-frame is minimized.

4. The method of claim 1 wherein a spreading rule dictates that a feedback report is transmitted as soon as possible under the restriction that feedback reports for no more than X RX sub-frames are sent per TX sub-frame in a transmit direction, where X=CEILING ($k_{RX}/k_{TX}$), with $k_{RX}$=the number of allocated RX sub-frames, $k_{TX}$=a number of allocated TX sub-frames, and CEILING is a mathematical operation that rounds up to the next integer.

5. The method of claim 1 wherein allocated RX sub-frames and TX sub-frames in the TDD or half duplex FDD arrangement are arranged in a given repeated sequence of sub-frames in a radio frame.

6. The method of claim 1:
   wherein the communication unit acting as the data receiving party is a terminal;
   wherein the RX sub-frames are downlink sub-frames;
   wherein TX sub-frames are uplink sub-frames.

7. The method of claim 1:
   wherein the communication unit acting as the data receiving party is a base station;
   wherein the RX sub-frames are uplink sub-frames;
   wherein the TX sub-frames are downlink sub-frames.

8. The method of claim 1 wherein the compressed feedback report is scheduled if a number of feedback reports scheduled according to a predetermined spreading rule is greater than a number of bits or messages available for reporting.

9. The method of claim 1 wherein the compressed feedback report indicates correct reception (ACK) if all data blocks in the set have been received correctly, and incorrect reception (NACK) if at least one data block in the set has been received with errors.

10. The method of claim 1 wherein the compressed feedback report contains a plurality of bits or messages each referring to a specific set of received data blocks.

11. The method of claim 1 wherein a mapping operation is performed to associate each received data block or RX sub-frame with the feedback report(s).

12. The method of claim 1 wherein a Hybrid ARQ (HARQ) protocol is used whereby each feedback report includes an ACK message or a NACK message.

13. An apparatus in a communication unit acting as a data receiving party and employing a TDD or half duplex FDD arrangement when communicating with a data sending party, the apparatus configured to cause transmission of feedback reports for data blocks received in receive (RX) sub-frames to indicate whether errors have occurred in the data blocks, the apparatus comprising:
   an obtaining unit configured to obtain allocation parameters for a connection indicating that a number of required feedback reports is greater than a number of allowed feedback reports during a given sub-frame sequence; and
   a scheduling unit configured to schedule a compressed feedback report for transmission in a transmit (TX) sub-frame, the compressed feedback report providing feedback information for a set of a plurality of data blocks in plural RX sub-frames in the sub-frame sequence.

14. The apparatus of claim 13 wherein the obtained allocation parameters indicate that a number of allocated RX sub-frames exceeds a number of allocated TX sub-frames.

15. The apparatus of claim 13 wherein a predetermined spreading rule dictates that a number of RX sub-frames reported in any TX sub-frame is minimized and that a maximum delay between any RX sub-frame and its associated TX sub-frame is minimized.

16. The apparatus of claim 13 wherein a spreading rule dictates that a feedback report is transmitted as soon as possible under the restriction that feedback reports for no more than X RX sub-frames are sent per TX sub-frame in a transmit direction, where X=CEILING ($k_{RX}/k_{TX}$), $k_{RX}$=a number of allocated RX sub-frames, $k_{TX}$=a number of allocated TX sub-frames, and CEILING is a mathematical operation that rounds up to the next integer.

17. The apparatus of claim 13 wherein allocated RX sub-frames and TX sub-frames in the TDD or half duplex FDD arrangement are arranged in a given repeated sequence of sub-frames in a radio frame.

18. The apparatus of claim 13:
   wherein the communication unit acting as the data receiving party is a terminal;
   wherein the RX sub-frames are downlink sub-frames;
   wherein the TX sub-frames are uplink sub-frames.

19. The apparatus of claim 13:
   wherein the communication unit acting as the data receiving party is a base station;
   wherein the RX sub-frames are uplink sub-frames;
   wherein the TX sub-frames are downlink sub-frames.

20. The apparatus of claim 13 wherein the scheduling unit is configured to schedule the compressed feedback report if a number of feedback reports scheduled according to a predetermined spreading rule is greater than a number of bits or messages available for reporting.

21. The apparatus of claim 13 wherein the compressed feedback report indicates correct reception (ACK) if all data blocks in the set have been received correctly, and incorrect reception (NACK) if at least one data block in the set has been received with errors.

22. The apparatus of claim 13 wherein the compressed feedback report contains a plurality of bits or messages each referring to a specific set of received data blocks.

23. The apparatus of claim 13 further comprising a mapping unit configured to perform a mapping operation to associate each received data block or RX sub-frame with the feedback report(s).

24. The apparatus of claim 13 wherein the communication unit is configured to use a Hybrid ARQ (HARQ) protocol whereby each feedback report includes an ACK message or a NACK message.

* * * * *